No. 637,131. Patented Nov. 14, 1899.
I. KLIMONT & O. NAGEL.
PROCESS OF REFINING FATS.
(Application filed Mar. 31, 1899.)
(No Model.)
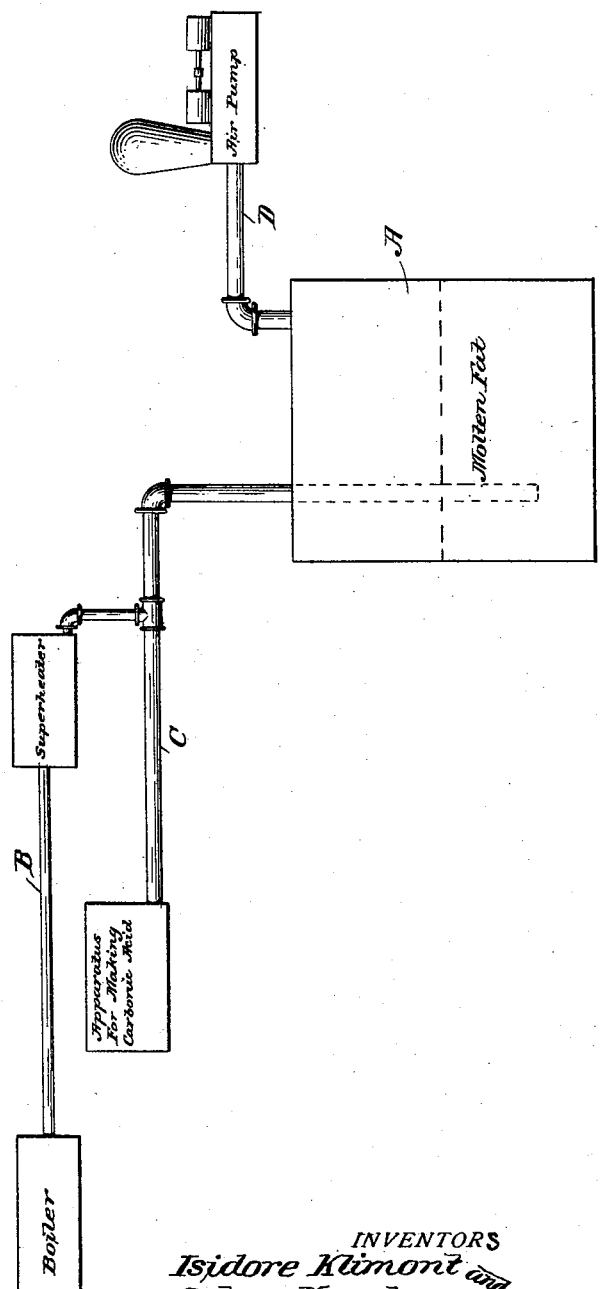
WITNESSES
A. B. Degges
Jac. A. Richmond
INVENTORS
Isidore Klimont and
Oskar Nagel
by G. Dittman
Attorney

UNITED STATES PATENT OFFICE.

ISIDOR KLIMONT AND OSKAR NAGEL, OF VIENNA, AUSTRIA-HUNGARY.

PROCESS OF REFINING FATS.

SPECIFICATION forming part of Letters Patent No. 637,131, dated November 14, 1899.

Application filed March 31, 1899. Serial No. 711,273. (No specimens.)

*To all whom it may concern:*

Be it known that we, ISIDOR KLIMONT and OSKAR NAGEL, chemists and doctors of philosophy, residing in Vienna, Austria-Hungary, have invented certain new and useful Improvements in Processes for Obtaining the Choicest Lard or Fat from Rancid Lard or Fat, of which the following is a specification.

This invention relates to a new and useful process for obtaining the choicest lard or fat from rancid lard or fat.

An old problem of practical chemistry is to render rancid or inferior fat suitable for human consumption, and for a great number of years many chemists have been engaged in labors tending to the attainment of this object. Attempts have been made to check the progress of rancidity by the addition of disinfectants or to remove the objectionable rancid smell by adding substances having an odor of their own. This, however, is but an expedient that does not nearly solve the problem. It must first of all be clearly established whence rancidity arises. Pigs' fat or lard consists of glycerids of fatty acids—viz., olein, palmitin, stearin, and trilinolein. In consequence of a somewhat protracted contact with humid air and under the action of light there occurs in the first place the decomposition of the glycerids of the unsaturated fatty acids, so that fatty acids possessing a comparatively small proportion of carbon are liberated, and the glycerin of the decomposed fat splits up into lactones, acid ethers, aldehydes, ketones, and anhydric acids of various kinds. The fitness of such fat for consumption is affected when the fat becomes rancid partly by the presence of free fatty acids and partly by unwholesome lactones, acid ethers, aldehydes, ketones, and anhydric acids. By removing these bodies, therefore, fat which is perfectly fit for consumption will be obtained. Now to begin with in regard to the removal of the free fatty acids a thing that would suggest itself almost directly was to separate them by saponification with an alkali. Yet in employing dilute alkalies, either free or carbonated, some very inconvenient emulsions have to be reckoned with, which so materially add to the difficulty of the operation as to affect its economical aspect most injuriously. We have found, however, as a result of numerous tests that both free and carbonated concentrated alkalies, and a silicated alkali in particular, are by far the best agents for saturating free acid, as by the use of alkali silicate a soap of considerable specific gravity and silicic acid are produced, which will somewhat violently drag the precipitate to the bottom, thereby enabling the subsequent filtering or pressing operation to be readily performed. After thus removing the free fatty acids from the rancid fat or lard the lactones, acid ethers, aldehydes, ketones, and anhydric acids yielded in the course of the decomposition of the glycerin remain to be got rid of. In regard to the lactones and acid ethers we have established by many experiments that by being heated for a comparatively lengthy period, together with free or carbonated alkalies or with alkaline earths, they become converted into salts of alkalies or alkaline earths of the corresponding acids, which salts, being solid and insoluble in fat, are capable of being readily separated therefrom. It is therefore only necessary in order to eliminate the lactones and acid ethers to heat the fat relieved from free fatty acids for a considerable time in the presence of a small quantity of an aqueous concentrated alkali lye or of an aqueous solution of alkali carbonates and then to remove the soaps that have formed by either scooping them off or by filtration. The aldehydes and ketones, as well as the anhydric acids, and partly, also, the lactones, may be got rid of by turning to account the circumstance that they will readily liquefy in water-vapors. To this end ordinary or superheated steam is conducted through the substance under treatment. This operation may be conducted under normal air-pressure or *in vacuo*, and the separation of these products of decomposition may be assisted by sending through a current of an inert gas, such as carbonic-acid gas, water-gas, &c. By such treatment the fat may be thoroughly refined or purified, it being merely necessary to decant it from the condensation-water, the result being fat or lard perfectly fit for consumption.

In the accompanying drawing we have shown, as an example, an apparatus for carrying out this process.

A is the container for the molten fat or lard, which is connected by pipe B with the boiler, a superheater being interposed, as shown, and by pipe C with an apparatus for making carbonic acid or other inert gas. The receptacle A may also communicate with an air-pump by means of pipe D in the event the lard is to be treated *in vacuo*.

The course to be pursued in carrying out this refining process is as follows: The rancid lard or fat is first melted, then placed in a mixing-chamber, and while it is therein brought to a temperature of from 60° to 80° Centigrade some solution of soluble glass or a certain amount of any other concentrated alkaline solution is added until the free acid is saturated, the fact that this stage has been reached being ascertained by testing a sample with the usual testing media—such as phenol-phtaleine, rosoleic acid, litmus, &c.—which will indicate the absence of acid. The mixture is then allowed to settle and the molten fat is drawn off and, if necessary, filtered. The fat obtained is now for some time heated with a concentrated solution of free or carbonated alkali and may or may not be again filtered. No saponification can take place, because we add a very small excess of alkali lye to eliminate the lactones and acid ethers. We have found that rancid fat contains in most cases three-fourths to one and one-fourth per cent. of lactones and acid ethers. In now adding two per cent. of an aqueous concentrated alkali lye this is sufficient to get rid entirely of the lactones and acid ethers present. It is then conveyed into a still and steam is sent through it either *in vacuo* or under pressure in the presence of atmospheric air, or one of the inert gases mentioned above being, if desired, conducted through the fat at the same time, which operation is continued until all the products of decomposition have been expelled. The fat is then allowed to cool and separated from the condensation-water.

Having now particularly described and ascertained the nature of our said invention and in what manner the same is to be performed, we declare that what we claim is—

1. The process herein described for rendering rancid or inferior lard fit for consumption, which consists in melting it, and saturating the free acids with an alkaline silicate; separating the fat from the soap and silicic acid; boiling it with concentrated alkali solutions and thereafter filtering to eliminate the salts, substantially as described.

2. The herein-described process for refining or clarifying lard, which consists in melting it, and saturating the free acids with soluble glass; separating the fat from the soap and silicic acid; boiling the same with concentrated alkali solutions; filtering the salts separated, and passing a current of steam through the fat to remove the products of decomposition, substantially as set forth.

3. The herein-described process for refining or clarifying lard, which consists in melting it, and saturating the free acids with soluble glass; separating the fat from the soap and silicic acid; boiling the same with concentrated alkali solutions; filtering, to remove the salts separated; passing a current of steam through the fat to remove the products of decomposition, and thereafter separating the fat from the condensation-water, substantially as described.

4. The herein-described process for refining or clarifying lard, which consists in melting it, and saturating the free acids, at a temperature of 60° to 80° Centigrade, with a concentrated solution of soluble glass; separating the fat from the soap and silicic acid; boiling it with a concentrated aqueous solution of alkali lye; filtering to remove the salts separated; passing a current of steam through the fat to remove the products of decomposition, and thereafter separating the fat from the condensation-water, substantially as described.

In witness whereof we have hereunto signed our names this 1st day of March, 1899, in the presence of two subscribing witnesses.

ISIDOR KLIMONT.
OSKAR NAGEL.

Witnesses:
FRIEDRICH BINDER,
C. B. HURST.